United States Patent [19]

Ngo

[11] Patent Number: 4,582,875

[45] Date of Patent: Apr. 15, 1986

[54] METHOD OF ACTIVATING HYDROXYL GROUPS OF A POLYMERIC CARRIER USING 2-FLUORO-1-METHYLPYRIDINIUM TOLUENE-4-SULFONATE

[75] Inventor: That T. Ngo, Irvine, Calif.

[73] Assignee: Bioprobe International, Inc., Tustin, Calif.

[21] Appl. No.: 679,525

[22] Filed: Dec. 7, 1984

[51] Int. Cl.[4] .................. C08F 283/00; C12N 11/06
[52] U.S. Cl. .................. 525/54.11; 525/54.1; 435/178; 435/179; 435/180; 435/181; 260/112 R; 260/112 G
[58] Field of Search .................. 525/54.1, 54.11, 54.2, 525/54.21, 54.24, 54.3, 54.31; 435/178, 179, 180, 181; 260/112 R, 112 G

[56] References Cited

U.S. PATENT DOCUMENTS 4,195,128 3/1980 Hildebrand et al. ............ 435/179
4,415,665 11/1983 Mosbach et al. ............ 435/179

OTHER PUBLICATIONS

R. Axen et al., *Acta Chem. Scand.*, B 29:471–474 (1975).
K. Nilsson et al., *Biochem. Biophys. Res. Comm.*, 102:449–457 (1981).
K. Nilsson et al., *Eur. J. Biochem.*, 112:397–402 (1980).
T. Mukaiyama et al., *Chem. Lett.*, 1159–1162 (1975).
Porath et al., "Immobilized Enzymes. Methods in Enzymology", (Mosback K., Ed.), vol. 44, pp. 19–45, Academic Press, New York (1976).
Chemical Abstracts, 86:138863r, 1977.
Chemical Abstracts, 87:21667i, 1977.
Chemical Abstracts, 89:197106f, 1978.
Chemical Abstracts, 91:101557w, 1979.
Chemical Abstracts, 101:73041c, 1984.

*Primary Examiner*—John Kight
*Assistant Examiner*—Nathan M. Nutter
*Attorney, Agent, or Firm*—Nilsson, Robbins, Dalgarn, Berliner, Carson & Wurst

[57] ABSTRACT

Organic ligands containing at least one primary or secondary amino group or sulfhydryl group are coupled to a polymeric carrier containing at least one hydroxyl group, by activating the polymeric carrier by treatment with 2-fluoro-1-methylpyridinium toluene-4-sulfonate and reacting the activated polymeric carrier with the organic ligand which is thereby bonded directly to a carbon atom of the polymeric carrier. The polymeric carrier can, for example, be a possibly cross-linked polysaccharide and the organic ligand is preferably a biologically active material such as a drug or protein. The coupling product is an affinity matrix which can be used for affinity purification, covalent chromatography and reversible or irreversible covalent immobilization of biologically active molecules. The coupling method can be performed under mild conditions not damaging sensitive molecules.

20 Claims, 3 Drawing Figures

METHOD OF ACTIVATING HYDROXYL GROUPS OF A POLYMERIC CARRIER USING 2-FLUORO-1-METHYLPYRIDINIUM TOLUENE-4-SULFONATE

FIELD OF THE INVENTION

This invention relates to a method of covalently binding organic ligands to polymeric carriers. In one of its more particular aspects the invention relates to a new method of covalently binding organic ligands containing one or more primary or secondary amino or sulfhydryl groups to polymeric gels.

BACKGROUND AND SUMMARY OF THE INVENTION

Hydroxyl group containing polymers such as polysaccharide gels are widely used as solid supports for preparing biospecific affinity matrices. Several methods are known for coupling biologically active affinity ligands to water insoluble carriers containing hydroxyl groups. These methods have been used for binding proteins such as enzmes, antibodies and antigens to solid carriers to produce coupling products which have found use in many different fields of technology. One example thereof is in connection with immunologic determination methods wherein antibodies or antigens have been bonded to water insoluble polymeric carriers. Another important application is in connection with affinity chromatography wherein an organic ligand having biospecific affinity to some other organic substance has been bonded to water insoluble polymeric carriers. Water insoluble polymers have also been bonded to proteins for modifying properties thereof.

The coupling of the ligand to the carrier is often carried out in such a manner that the carrier is activated by a reactive group which is then reacted with the desired ligand. Examples of known activation methods are activation by means of cyanogen bromide, CNBr, which is disclosed in Porath, et al., "Immobilized Enzymes. Methods in Enzymology," Vol. 44 (Mosbach, K., Ed.) page 19-45, Academic Press, New York (1976). The use of CNBr for activating hydroxyl groups of polymeric carriers is the earliest and most widely used method. However, CNBr activation procedures suffer from certain disadvantages, namely, (1) the linkages formed between CNBr activated gels and amino groups of affinity ligands are labile, (2) the reaction results in the introduction of charged species which interfere with affinity absorption, and (3) CNBr is a noxious, lachrimatory and poisonous chemical which requires special care in its handling. Another method for activating polymeric carriers is the use of organic sulfonyl chlorides, particularly, 2,2,2-trifluoroethanesulfonyl chloride (tresyl chloride). Such activating agents are, however, relatively expensive and are in liquid rather than solid forms. Further, some prior art coupling methods may give rise to changed charge conditions for the organic ligand, for example, by the formation of charged groups at their binding site during the coupling. This makes the product unsuitable for affinity chromatography.

The present invention has as a principal object providing a stable and hydrolysis-resistant coupling product of a polymeric gel and an organic ligand in which the organic ligand is covalently bonded directly to a carbon atom in the polymeric carrier gel. Another object of the present invention is to provide a process which can be conducted under relatively mild conditions in order to avoid any detrimental effect upon reactants such as sensitive biological ligands.

These and other objects of the invention are achieved by forming a reactive derivative of a polymeric hydroxyl-containing gel by reacting the gel with 2-fluoro-1-methylpyridinium toluene-4-sulfonate, which will hereinafter be referred to at times as FMP, and then reacting the activated carrier with a ligand containing a primary amino or sulfhydryl group.

The method according to the present invention thus comprises an activation step, wherein the 1-methyl-2-pyridoxy type leaving group is introduced into the polymeric carrier and a coupling step in which the organic ligand is bonded covalently to the polymeric character while splitting off the leaving group.

DETAILED DESCRIPTION

Figure 1:
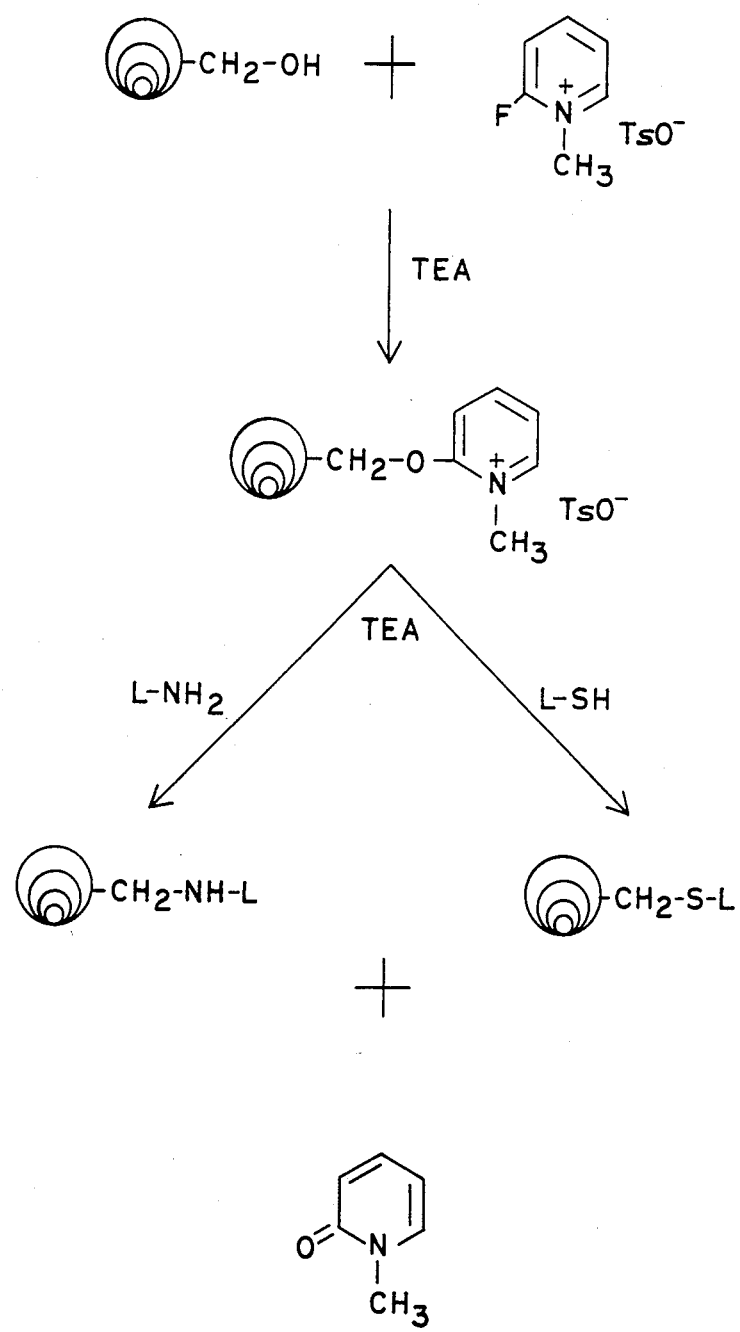
FIG. 1 is a schematic flow sheet illustrating the process of the present invention.

The polymeric carrier can be a water insoluble or water soluble polymeric substance and the choice of the carrier is not critical for carrying out the process of the present invention. In principal, any type of carrier can be used which has a polymeric nature and contains at least one hydroxyl group bonded to a carbon atom which is available for activation and coupling. The carrier is chosen with regard to the requirements in the individual situation, primarily with regard to the type of ligand to be coupled and the intended use of the coupling product. The carrier may be comprised of natural, semi-synthetic or synthetic materials containing hydroxyl groups. Examples of important carrier materials are polysaccharides and polysaccharide containing materials, for example, cellulose, agarose, dextran and cross-linked products thereof. Examples of synthetic carriers are polyethylene glycol, polyvinyl alcohol, polyhydroxyethyl methyl acrylate and the like. It is, of course, also possible to use carriers which normally do not contain hydroxyl groups but which, by suitable treatment, can be provided with such groups. An example is silica particles, to the surface of which have been bonded groups containing at least one hydroxyl group bonded to a carbon atom.

The activation of hydroxyl containing polymeric carriers can be carried out in the presence of a slight excess of a tertiary amine such as triethylamine or tributylamine in dry polar organic solvents such as acetonitrile, acetone or tetrahydrofuran. FMP reacts rapidly, usually in about 1–15 minutes at ambient conditions of temperature and pressure, for example, at about 22°–35° C., with hydroxyl groups of various polymeric materials to form 2-alkoxy-1-methylpyridinium salts, which react readily with amino or sulfhydryl groups of various nucleophiles suitable for use as affinity ligands. Other 2-halo-1-methylpyridinium salts such as 2-chloro-1-methylpyridinium salts can be used, but the 2-fluoro- 1-methylpyridinium salt is preferred because of its greater reactivity.

Unreacted activating agent such as FMP can be easily washed from the polymeric carrier with a dilute acid such as dilute HCl, for example, with 2 mM HCl, to purify and stabilize the activated polymer without causing hydrolysis of the activated hydroxyl groups.

The FMP-activated polymeric carrier was found to be stable for at least 4 months when stored at 4° C. in 2 mM HCl. The activated polymeric carrier can also be stored in dilute mineral acids such as 2 mM phosphoric acid or in dry form, if desired. Activation densities of 4–7 micromoles per ml of gel are routinely obtained.

The coupling method of the present invention is generally applicable to organic ligands containing the indicated amino or sulfhydryl groups. For example, primary amino, secondary amino or sulfhydryl groups may be utilized for the desired coupling to the activated polymeric hydroxyl containing polymer. Likewise, salts of sulfhydryl group containing compounds such as Na salts thereof are useful for this purpose. In general, the product selected for coupling should be a good nucleophile, so that the coupling reaction can be carried out smoothly. Any group capable of displacing the 1-methyl-2-pyridoxy group from the polymeric carrier is satisfactory for use as a ligand. Thus, the ligand may contain any aliphatic, aromatic, heterocyclic, or heteroaromatic radical or any radical which is a combination of the foregoing, so long as the resulting ligand will have functional groups available for coupling. Of special interest are biologically active ligands, for example, proteins, such as enzymes; antibodies and antigens; amino acids; thiol compounds; cofactors; nucleotides; polynucleotides; haptens and many other types of biologically active ligands, especially those having biospecific affinity to another substance which can be used, for example, for affinity chromatographic purposes.

The reaction scheme is illustrated in FIG. 1 of the drawings wherein the symbol ⓟ—CH$_2$—OH represents a polymeric carrier having at least one —CH$_2$—OH group, TsO$^-$ represents the toluene-4-sulfonate ion, TEA represents triethylamine, L—NH$_2$ represents an amino group containing ligand and L—SH represents a sulfhydryl group containing ligand.

Coupling can be carried out under varying conditions of temperature and pH and can be performed in aqueous reaction media as well as in polar organic solvents. Reaction conditions are not critical for either the activation step or the coupling step and are primarily chosen with regard to the sensitivity of the reactant and to practical considerations of convenience. Mild reaction conditions are preferred. It is, for example, often suitable to work at ambient temperatures and pressures and, in the case of an aqueous reaction medium, the pH is usually close to neutral, for example, pH 8–9. The degree of coupling to the hydroxyl groups of the carrier can be varied as needed by stoichionmetric adjustment to utilize essentially all available hydroxyl groups or whatever part thereof is desired. Coupling efficiencies of 70–80% are realized routinely.

Unreacted activated groups remaining after coupling, which might impede further utilization of the coupled polymer, can be removed by suspending the coupled polymer in 0.2M Tris-HCl, pH 9, at room temperature, for 2 hours. Other nucleophiles such as ethanolamine or mercaptoethanol can also be used for this purpose.

The invention will be better understood by reference to the following examples which are intended for purposes of illustration and are not to be construed as in any way limiting the scope of the present invention, which is defined in the claims appended hereto.

EXAMPLE 1

Activation of Cross-Linked Agarose with 2-Fluoro-1-methylpyridinium toluene-4-sulfonate (FMP)

Sepharose CL-4B was washed successively with 20 gel volumes of distilled water and mixtures of acetone and water having volume-to-volume ratios of 25:75, 50:50, 75:25 and 100% acetone and finally, with 10 gel volumes of dry acetone. A quantity of 50 g of the washed Sepharose gel was suspended in 50 ml of dry acetonitrile mixed with 1 ml of dry triethylamine and stirred vigorously at room temperature. A solution of 3 g of FMP in 40 ml of dry acetonitrile and 1.5 ml of dry triethylamine was added to the gel suspension in 5 ml portions. After 10 minutes the gel was washed with 10 gel volumes of mixtures of acetone and 2 mM HCl having a volume-to-volume ratio of 75:25, 50:50, 25:75 and undiluted 2 mM HCl.

EXAMPLE 2

Coupling of N,ε-2,4-Dinitrophenyl-L-lysine to Activated Gel

A quantity of 100 mg of N,ε-2,4-dinitrophenyl-L-lysine was dissolved in 30 ml of 0.2M NaHCO$_3$. To this solution was added 5 g of the FMP-activated gel prepared according to the method of Example 1. The resulting suspension was stirred at room temperature for 15 hours. The gel was then removed from the suspension and washed with 500 ml of 0.2M NaHCO$_3$, resuspended in 100 ml of 0.1M Tris-HCl, pH 8, and stirred at room temperature for 2 hours. The gel was then washed with 500 ml of 1M NaCl and 500 ml of 0.1M sodium phosphate buffer, pH 7.5, containing 0.15M NaCl (PBS).

EXAMPLE 3

Coupling of Tobramycin to Activated Gel

The FMP-activated gel prepared according to Example 1 and stored in 2 mM phosphoric acid solution was removed from the phosphoric acid and a 20 ml quantity of the FMP-activated gel was added to 10 ml of 0.5M NaHCO$_3$ containing 0.2 millimole of tobramycin.

The gel suspension was gently stirred at room temperature for 24 hours and then washed with 500 ml phosphate buffered saline (PBS). The washed gel was suspended in 0.1M Tris for 15 minutes to deactivate any unreacted activated hydroxyl groups. Then the gel was washed with 500 ml of PBS, 1000 ml PBS containing 1M NaCl, and finally with 500 ml of PBS.

In order to determine the extent of activation of the hydroxyl groups of the polymeric carrier, the density of activation expressed in units of micro moles per ml of gel is measured. Since 1-methyl-2-pyridone is released from the activated gel upon coupling with nucleophiles, it is possible to quantitatively determine the density of activation by means of the absorbance at 297 nm of the solution in which the coupling reaction is conducted. At this wavelength in 0.2M Tris-HCl, pH 9, 1-methyl-2-pyridone has a molar extinction of 5900. The density of activation can then be determined by suspending 1 ml of activated gel in 2 ml of 0.2M Tris-HCl, pH 9, and stirring gently at room temperature for 10 hours. Upon centrifuging the resulting gel suspension the absorbance of the supernatant at 297 nm is measured and compared with the absorption of solutions of 1-methyl-2-pyridone of known concentration. Using the activation procedure herein described, an activated gel with activation density of 40-70 micro-moles/ml of Sepharose CL-4B was obtained.

The coupled products prepared according to the present invention are useful in various applications where it is desired to have a ligand, such as a biologically active material, immobilized by attachment to a polymeric carrier, for example, in affinity purification, covalent chromatography, and reversible and irreversible covalent immobilization of biomolecules. The use of the coupling products in affinity chromatography is illustrated in the following examples:

EXAMPLE 4

Figure 2:
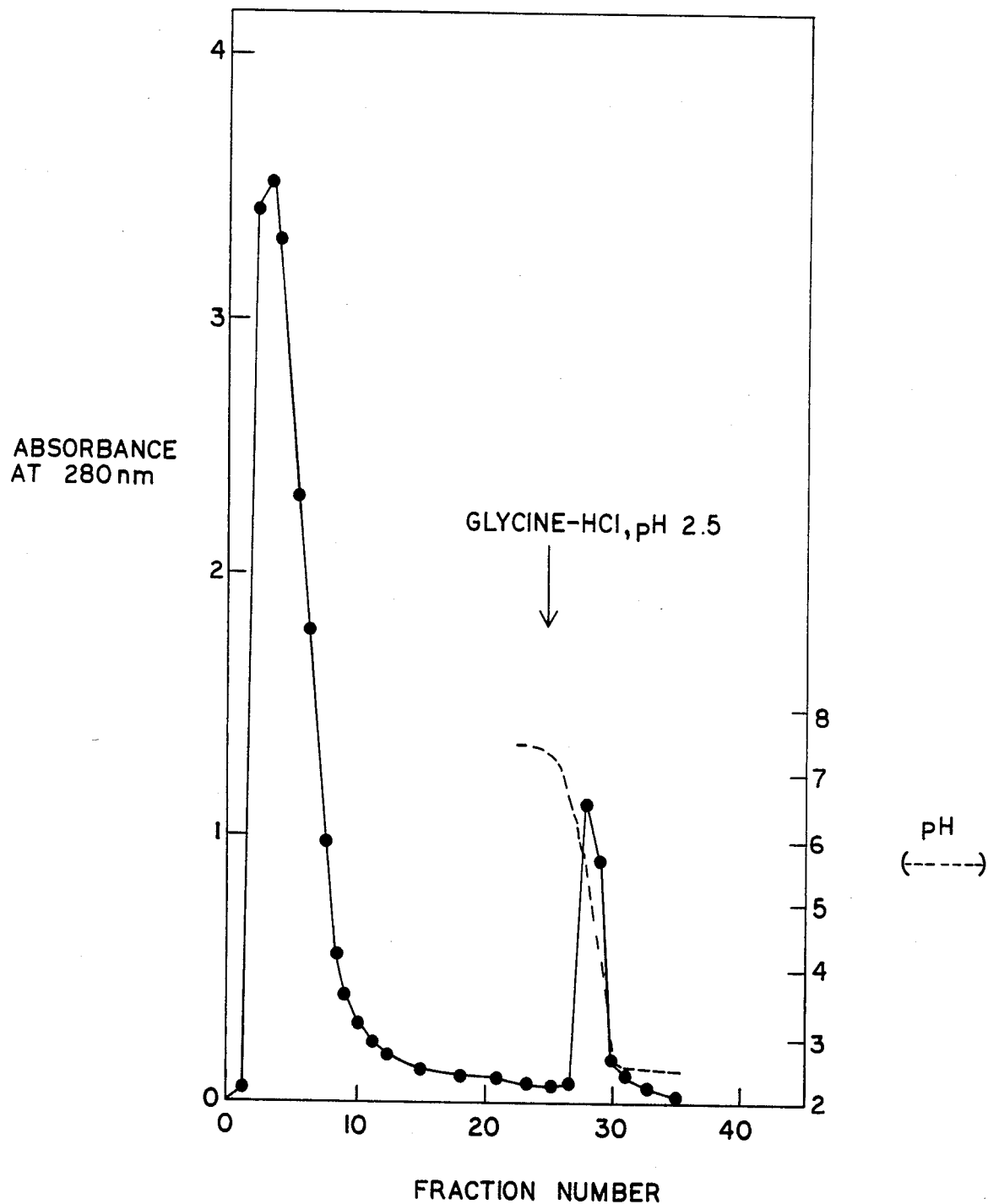
FIG. 2 is an elution curve illustrating the affinity purification of rabbit antiserum to 2, 4-dinitrophenyl bovine serum albumin using 2, 4-DNP-lysine conjugated Sepharose CL-4B as the affinity matrix.

Purification of Rabbit Anti-serum to 2,4-Dinitrophenyl Bovine Serum Albumin Using N,ε-2,4-Dinitrophenyl-L-Lysine Conjugated Sepharose CL-4B as the Affinity Matrix A quantity of 2 ml of rabbit anti-DNP serum was centrifuged to remove particulates. The supernatant was applied onto a 0.5×20 cm column of N,ε-2,4-dinitrophenyl-L-lysine conjugated Sepharose CL-4B prepared according to Example 2. After applying the antiserum, the column was washed extensively with PBS until the absorbance at 280 nm of the eluate was less than 0.02. Then 0.1M glycine-HCl, pH 2.5, containing 10% by volume of tetrahydrofuran was used as the eluant. The antibody appeared in the third 5 ml. fraction after applying glycine-HCl buffer. The results of this experiment are shown in FIG. 2.

EXAMPLE 5

Figure 3:
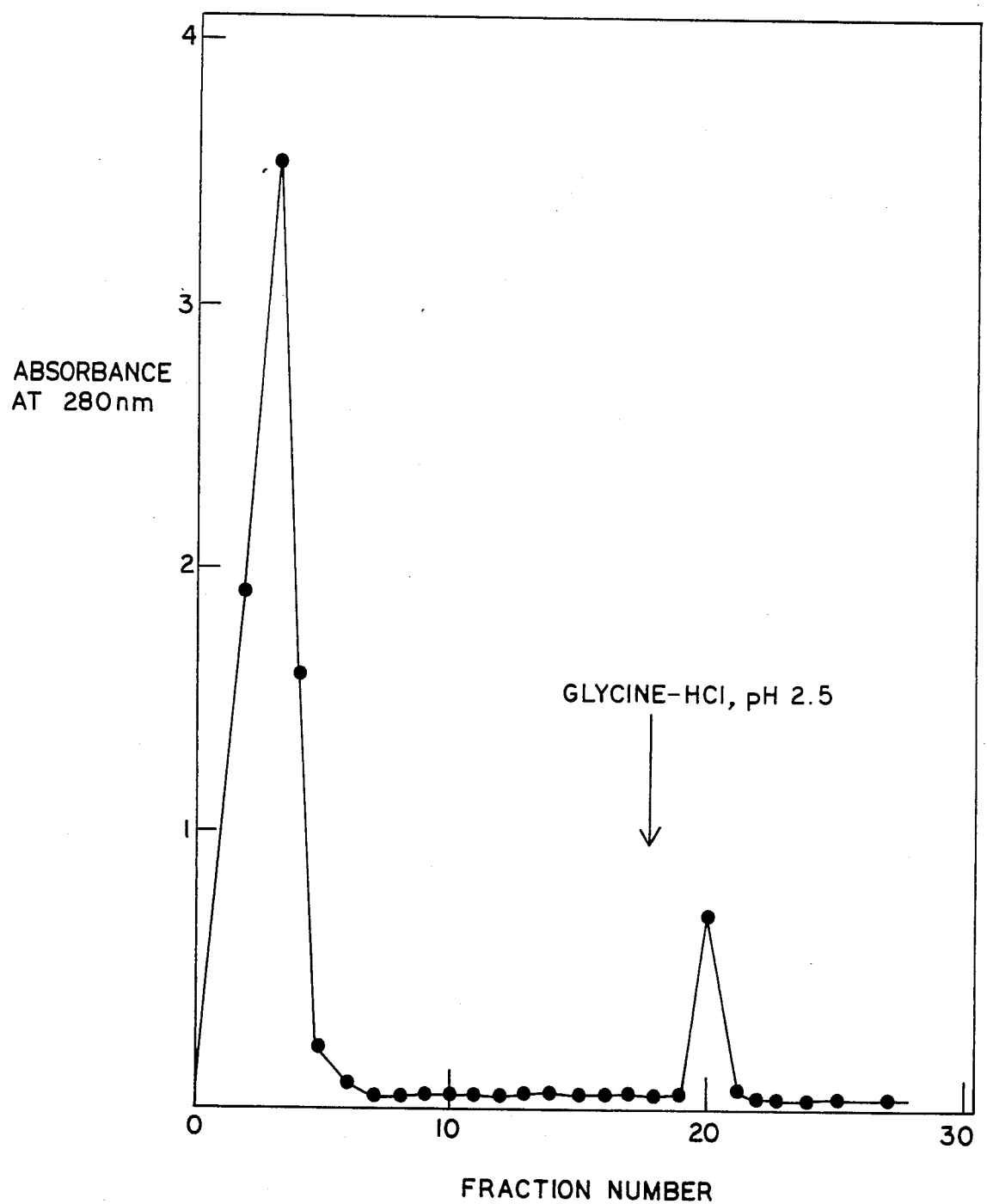
FIG. 3 is an elution curve illustrating the affinity purification of rabbit anti-tobramycin serum using tobramycin conjugated Sepharose CL-4B as the affinity matrix.

Affinity Purification of Rabbit Anti-to-bramycin Serum Using Tobramycin Conjugated Sepharose CL-4B as the Affinity Matrix A quantity of 1 ml of rabbit anti-tobramycin serum was diluted tenfold with PBS. The diluted antiserum was centrifuged at 2000 rpm for 30 minutes to remove solid debris. The entire supernatant was applied to a 0.5×20 cm column of Sepharose CL-4B conjugated with tobramycin prepared as described in Example 3. The column was washed with PBS until the absorbance of the eluate at 280 nm was less than 0.02. The antibodies were eluted with 0.1M glycine-HCl, pH 2.5 containing 10% tetrahydrofuran in 7 ml. fractions. The results of this experiment are shown in FIG. 3.

As shown in Examples 4 and 5 above, the ligand coupled polymeric carriers prepared according to the process of this invention are useful as affinity absorbants for purifying various materials which are capable of forming affinity bonds with the ligand coupled polymer. For example, the ligand coupled polymers can be used for purification of antibodies in which case elution of the antibodies absorbed upon the affinity matrix can be accomplished without causing leakage of the ligand from the matrix. The ligand coupled matrix is also characterized by stability during storage. For example, the N,ε-2,4-Dinitrophenyl-L-lysine coupled Sepharose CL-4B was stored in phosphate buffered saline at 4° C. without losing any ligand by leakage from the ligand-coupled matrix.

As mentioned above, an important advantage of the coupling method of the present invention is that the coupled substance, that is, the ligand, is covalently bonded directly to a carbon atom of the polymeric carrier, which makes splitting off by hydrolysis unlikely. Furthermore, no additional charge is introduced during the coupling reaction as is the case in some of the prior art coupling methods. Cross-linking of the carrier material, which is a common and undesired side effect of coupling methods previously available, is avoided by means of the coupling method of the present invention.

The foregoing description of the invention has been directed to particular preferred embodiments for purposes of explanation and illustration. It will be apparent, however, to those skilled in the art that many modifications and changes in the methods and materials may be made without departure from the scope and spirit of the invention. For example, other hydroxyl containing polymeric carriers and other ligands may be used. Particular affinity systems described herein have been chosen for convenience and are not intended to be limiting. It is the applicant's intention in the following claims to cover all such equivalent modifications and variations as fall within the true scope and spirit of the invention.

What is claimed is:

1. A process for activating a hydroxyl group of a polymeric substance containing at least one hydroxyl group comprising:
   reacting a polymeric substance containing at least one hydroxyl group with 2-fluoro-1-methylpyridinium toluene-4-sulfonate, and
   recovering a polymeric product wherein at least some of the hydroxyl groups of the polymer have been converted to 1-methyl-2-pyridoxy groups.

2. A process according to claim 1 wherein the reaction is conducted in the presence of a slight excess of a tertiary amine and in a dry polar organic solvent at a temperature in the range of about 22°-35° C. for a period of about one to fifteen minutes.

3. A process according to claim 1 wherein the separated 1-methyl-2-pyridoxy substituted polymer is purified and stabilized by washing with a dilute acid and the resulting purified and stabilized polymer containing 1-methyl-2-pyridoxy groups is stored in a dilute acid or dried at a temperature of about 4° C. or lower.

4. A process according to claim 1 wherein the 1-methyl-2-pyridoxy substituted polymer is washed with 2 mM HCl and dried.

5. A process according to claim 1 wherein said hydroxyl group containing polymer is a polysaccharide.

6. A process according to claim 5 wherein said polysaccharide is a dextran.

7. A process according to claim 5 wherein said polysaccharide is a cross-linked dextran.

8. A process according to claim 5 wherein said polysaccharide is an agarose.

9. A process according to claim 5 wherein said polysaccharide is a cross-linked agarose.

10. A process according to claim 5 wherein said polysaccharide is in the form of a gel.

11. A process according to claim 5 wherein said polysaccharide is cellulose.

12. A process according to claim 1 wherein said polymer is polyethylene glycol.

13. A process according to claim 1 wherein said polymer is polyvinyl alcohol.

14. A process according to claim 1 wherein said polymer is a polyhydroxyethyl methyl acrylate.

15. A process according to claim 1 wherein said polymer comprises silica particles, to the surface of which have been bonded groups containing at least one hydroxyl group bonded to a carbon atom.

16. An activated polymer capable of forming covalent linkages with a nucleophilic ligand which comprises:
a hydroxyl-containing polymer wherein at least some of the hydroxyl groups have been converted to 1-methyl-2-pyridoxy groups.

17. A process of covalently binding:
(a) an organic ligand that contains at least one substituent selected from the group consisting of primary amino groups, secondary amino groups and sulfhydryl groups; directly to a:
(b) polymeric substance containing at least one hydroxyl group; comprising the steps of:
(1) first forming a reactive derivative by reacting (i) 1-fluoro-2-methylpyridinium toluene 4-sulfonate with
(ii) a polymeric substance containing at least one hydroxyl group, wherein at least one reacting hydroxyl group is bonded to carbon atoms in the polymeric substance and then
(2) reacting said reactive derivative directly with the organic ligand as set forth in (a).

18. A product of coupling an organic ligand that contains at least one substituent selected from the group consisting of primary amino groups, secondary amino groups, and sulfhydryl groups to a polymeric substance containing at least one hydroxyl group; prepared according to the process of claim 17.

19. A process according to claim 18 wherein said organic ligand is N,ε-2,4-dinitrophenyl-L-lysine.

20. A process according to claim 18 wherein said organic ligand is tobramycin.

* * * * *